United States Patent [19]
Read

[11] Patent Number: 5,159,607
[45] Date of Patent: Oct. 27, 1992

[54] RF SIGNAL SYNTHESIS

[75] Inventor: Arnold G. Read, Abbotskerswell, United Kingdom

[73] Assignee: STC PLC, London, England

[21] Appl. No.: 646,402

[22] Filed: Jan. 28, 1991

[30] Foreign Application Priority Data

Feb. 16, 1990 [GB] United Kingdom ............. 9003582

[51] Int. Cl.⁵ ............................................. H04K 1/00
[52] U.S. Cl. .......................................... 375/1; 380/34
[58] Field of Search ................. 375/1, 38; 370/18; 380/34

[56] References Cited

U.S. PATENT DOCUMENTS

| | | | |
|---|---|---|---|
| 4,308,617 | 12/1981 | German, Jr. | 375/1 |
| 4,888,788 | 12/1989 | Teranishi et al. | 375/1 |
| 4,922,506 | 5/1990 | McCallister et al. | 375/1 |
| 5,022,048 | 6/1991 | Kingston et al. | 375/1 |

Primary Examiner—Tod Swann
Attorney, Agent, or Firm—Lee, Mann, Smith, McWilliams, Sweeney & Ohlson

[57] ABSTRACT

Apparatus for synthesizing complex composite RF signals comprising a source of unmodulated RF carrier signal, means for splitting the RF carrier signal output of the source into equal components, separate modulating means to which respective carrier signal components are applied, signal combining means to which the outputs of the modulating means are applied, and separate computerized in-phase and quadrature baseband control signal generating means the outputs of which are applied to respective modulating means to effect modulation of the respective carrier signal components.

2 Claims, 1 Drawing Sheet

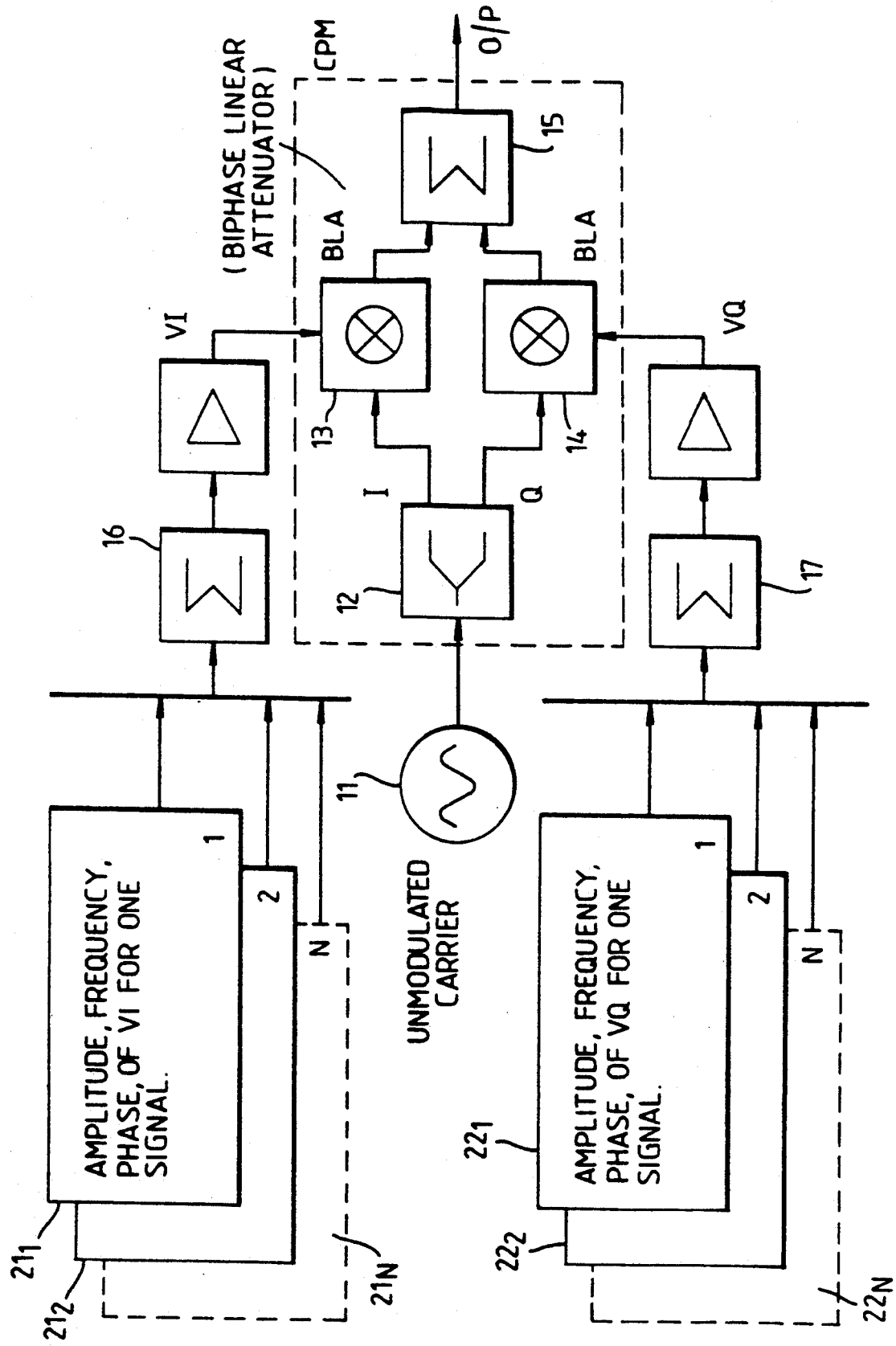

RF SIGNAL SYNTHESIS

FIELD OF THE INVENTION

This invention relates to apparatus and method for generating complex composite RF signals, such as spread spectrum signals.

Spread spectrum signals are used in satellite navigation systems such as Global Positioning System (GPS) or Glonass. For development and evaluation purposes it is desirable to simulate locally such signals in laboratory equipment.

DESCRIPTION OF RELATED ART

U.S. Pat. No. 4,308,617 discloses an arrangement for coding a transmitted carrier wherein I & Q components of the carrier are separately mixed with separately coded outputs of respective pseudo-noise (PN) generators, the mixed outputs being summed to form the output signal.

SUMMARY OF THE INVENTION

According to the present invention there is provided apparatus for synthesising complex composite RF signals including a source of unmodulated RF carrier signal, means for splitting the RF carrier signal output of the source into equal components, separate modulating means to which respective carrier signal components are applied, signal combining means to which the outputs of the modulating means are applied, and separate baseband control signal generating means the outputs of which are applied to respective modulating means to effect in-phase and quadrature modulation of the respective carrier signal components, the baseband control signal generating means for each modulating means comprises a plurality of computing means each arranged to compute a different set of amplitude, frequency and phase parameters for modulating a respective carrier signal component and means for summing the outputs of the computing means for application to the modulating means.

In a preferred embodiment the modulating means each comprise a biphase linear attenuator.

BRIEF DESCRIPTION OF THE DRAWINGS

An embodiment of the invention will now be described with reference to the accompanying drawing which is a block schematic diagram of an apparatus for generating complex composite RF signals.

DESCRIPTION OF THE PREFERRED EMBODIMENT

In the arrangement illustrated an oscillator 11 or other form of generator provides an unmodulated carrier signal which is fed, via splitter 12, to two modulators 13, 14. The equal carrier signal inputs to the modulators form the basis for subsequent I & Q quadrature components of a complex composite RF signal output. The outputs of modulators 13 and 14 are then summed in network 15 to provide the RF output. The modulation control signals applied to modulators 13, 14 are derived from, for example, pluralities of computerised signal generators $21_1, 21_2 \ldots 21_N$ and $22_1, 22_2 \ldots 22_N$. These are arranged to generate control signals representing sets of amplitude, frequency and phase parameters for the respective I & Q components of the complex composite RF signal. Such parameters can be used for generating, for example, spread spectrum signals as are used in global positioning systems (GPS) to simulate signals received from a number of satellites. The sets of control signals from each plurality of signal generators are summed in respective summing networks 16, 17 and, after any necessary amplifications, applied to the respective modulators 13, 14. Preferably the modulators 13, 14 are biphase linear attenuators such as are manufactured by Olektron Corporation.

I claim:

1. Apparatus for synthesising complex composite RF signals including a source of unmodulated RF carrier signal, means for splitting the RF carrier signal output of the source into I and Q quadrature components, separate modulating means to which respective carrier signal components are applied, signal combining means to which the outputs of the modulating means are applied, and separate baseband control signal generating means the outputs of which are applied to respective modulating means to effect in-phase and quadrature modulation of the respective carrier signal components, the baseband control signal generating means for each modulating means comprises a plurality of computing means each arranged to compute a different set of amplitude, frequency and phase parameters for modulating a respective carrier signal component and means for summing the outputs of the computing means for application to the modulating means.

2. A method of synthesising complex composite RF signals comprising the steps of generating an unmodulated RF carrier signal, splitting the unmodulated RF carrier signal into I and Q quadrature components, computing separate sets of amplitude, phase and frequency baseband in-phase and quadrature parameters for each component, modulating each component separately with respective in-phase and quadrature sets of computed baseband parameters and summing the modulated components to form the complex composite RF signal.

* * * * *